(12) United States Patent
Hernández

(10) Patent No.: US 7,332,203 B2
(45) Date of Patent: Feb. 19, 2008

(54) GLASS FORMING TUBE, AND GLASS CAKE AND METHOD INCORPORATING SAME

(75) Inventor: Ismael A. Hernández, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 529 days.

(21) Appl. No.: 10/686,069

(22) Filed: Oct. 15, 2003

(65) Prior Publication Data

US 2005/0084673 A1   Apr. 21, 2005

(51) Int. Cl.
  *B65H 75/18*   (2006.01)
  *B32B 1/08*    (2006.01)
(52) U.S. Cl. .................................... 428/34.2; 442/76
(58) Field of Classification Search ............... 428/34.2; 442/76
  See application file for complete search history.

(56) References Cited

U.S. PATENT DOCUMENTS

| | | | |
|---|---|---|---|
| 2,751,936 A | 6/1956 | Dunlap et al. | |
| 2,767,741 A | 10/1956 | Knowland et al. | |
| 3,323,751 A | 6/1967 | Cunningham et al. | |
| 3,424,204 A | 1/1969 | Sato | |
| 3,429,522 A | 2/1969 | Cunningham et al. | |
| 3,451,433 A | 6/1969 | Cunningham et al. | |
| 3,910,513 A | 10/1975 | Gelin et al. | |
| 4,026,690 A | 5/1977 | McClellan | |
| 5,514,429 A | 5/1996 | Kamihgaraguchi et al. | |
| 5,710,853 A | 1/1998 | Von Hoessle et al. | |
| 5,762,643 A * | 6/1998 | Ray et al. ................... | 604/383 |
| 6,165,321 A * | 12/2000 | Pauley et al. ............... | 162/158 |

FOREIGN PATENT DOCUMENTS

| EP | 0 553 493 A1 | 8/1993 |
|---|---|---|
| GB | 1035277 | 7/1966 |
| GB | 1129786 | 10/1968 |
| GB | 1193678 | 6/1970 |
| JP | 2002 037529 | 2/2002 |

OTHER PUBLICATIONS

The International Search Report for PCT Application No. PCT/US2004/033667; Filed Oct. 13, 2004; Date of Completion Jan. 21, 2005; Date of Mailing Feb. 2, 2005.

* cited by examiner

*Primary Examiner*—William P Watkins, III
(74) *Attorney, Agent, or Firm*—Alston & Bird LLP

(57) ABSTRACT

A forming tube for coated glass fiber is pervious to the vapors generated during the curing/drying process for the fiber. The forming tube can be formed from various materials, including but not limited to molded plastic with perforations, metal (e.g., a wire screen or cage structure), wound paperboard treated with sizing compound to render the paperboard impervious to liquid but pervious to vapors, wound synthetic paper or nonwoven material formed of synthetic fibers, or wound perforated paperboard.

1 Claim, 2 Drawing Sheets

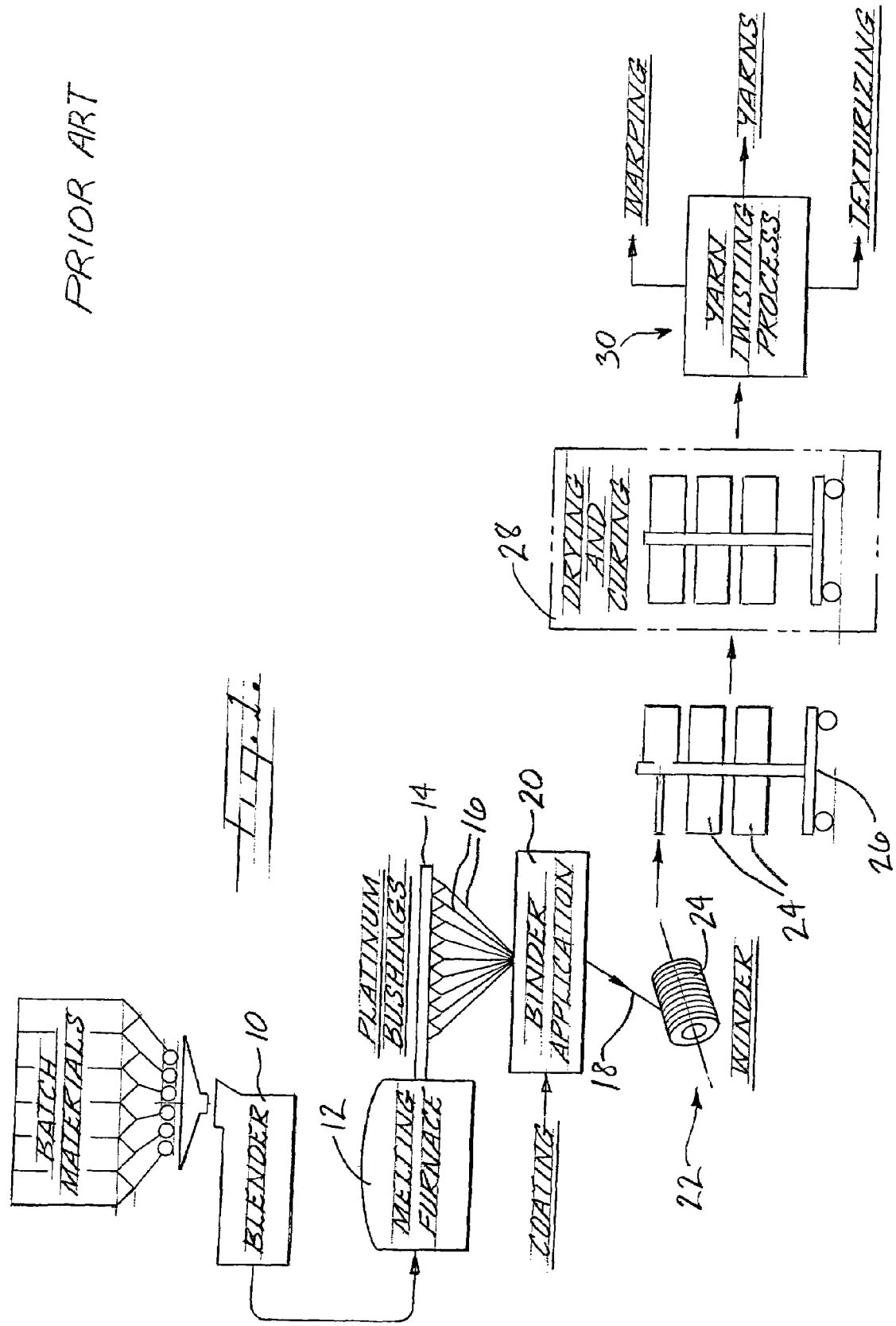

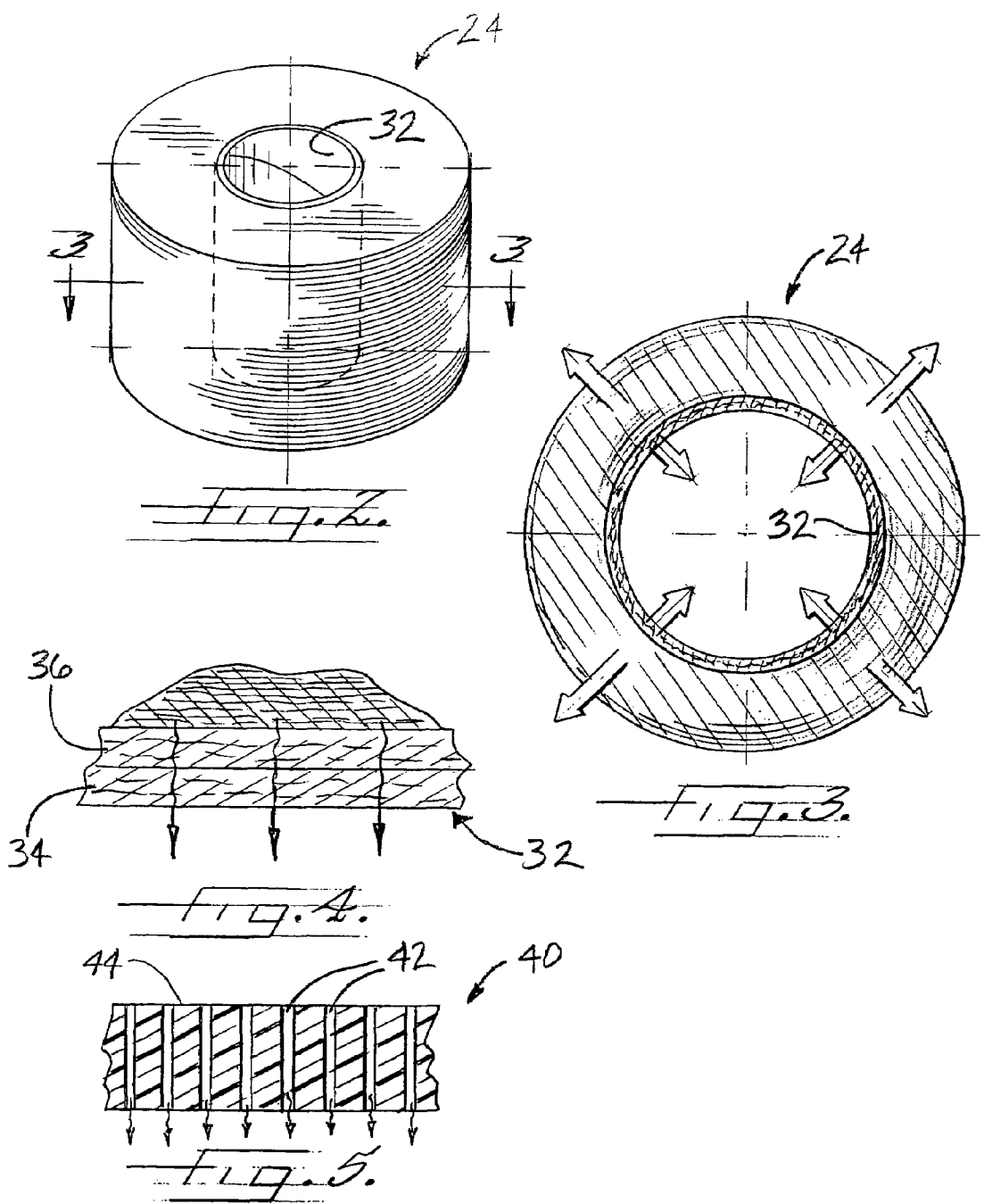

GLASS FORMING TUBE, AND GLASS CAKE AND METHOD INCORPORATING SAME

BACKGROUND OF THE INVENTION

1. Technical Field

The invention relates generally to the production of glass fiber, and more particularly to glass forming tubes used in the production of glass fiber.

2. Description of Related Art

In the production of glass fiber for various intended applications, glass strands are manufactured from molten glass streams flowing through orifices formed in a die or bushing. The strands are drawn in the form of continuous filaments and the filaments are gathered into base strands, which typically are then wound into rolls or "cakes".

Before they are gathered together in the form of strands, the filaments are coated with a coating of a binder or sizing composition. The binder or sizing serves as a lubricant and protects the strands during the fiber production process. The binder or sizing can also facilitate the binding of the filaments to one another within the strands. Good integrity is particularly important in textile applications where the strands are subjected to strong mechanical stresses. The binder or sizing also can facilitate an improved bond between the glass strands and the matrix material in a fiber-matrix composite material.

The binder or sizing compositions (hereinafter referred to generally as "coating compositions") typically are water-based. The water generally represents 90% by weight of the composition, and hence the water must be evaporated after application of the composition. Therefore, some type of drying device must be used to heat the coated glass strands. Typically, the coated glass strands or fibers are wound about forming tubes to form rolls or cakes, and then the cakes are heated in an oven or the like so as to dry/cure the coating.

Most forming tubes are formed of paperboard that is coated with silicone or the like to render the tubes impervious to the liquid coating composition, since the tubes are exposed to the composition when the wet coated fibers are wound onto the tubes. The coating also renders the tubes impervious to vapors. During the curing/drying process, vapors are generated by evaporation of the volatile component(s) of the coating composition. It has been found that vapor pressure that builds up in the cake can rise to such a level that the forming tube can implode. Additionally, the curing/drying process can take a considerable amount of time (e.g., up to 48 hours or more), and hence a significant amount of energy is expended.

BRIEF SUMMARY OF THE INVENTION

The present invention addresses the above needs and achieves other advantages by providing a forming tube that is pervious to the vapors generated during the curing/drying process. Consequently, the tendency of the forming tubes to implode is reduced or eliminated. Moreover, because the generated vapors can escape through the forming tube as well as through the outer surfaces of the cake, the curing/drying of the cake is accelerated so that a lesser amount of energy is required.

A forming tube in accordance with the invention can be formed from various materials, including but not limited to molded plastic with perforations, metal (e.g., a wire screen or cage structure), wound paperboard treated with sizing compound to render the paperboard impervious to liquid but pervious to vapors, wound synthetic paper or nonwoven material formed of synthetic fibers, or wound perforated paperboard. The openings or perforations through the wall of the forming tube in particular embodiments of the invention have a diameter or maximum distance across the opening less than about 0.1 inch. The outer surface of the tube, apart from the presence of the openings, is cylindrical.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a diagrammatic view of a conventional glass fiber forming process;

FIG. 2 is a perspective view of a glass fiber cake in accordance with one embodiment of the invention;

FIG. 3 is a cross-sectional view of the cake along line 3-3 of FIG. 2;

FIG. 4 is a magnified fragmentary cross-sectional view of the cake in the vicinity of the body wall of the forming tube; and FIG. 5 is a cross-sectional view of the body wall of a forming tube in accordance with another embodiment of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A conventional glass fiber forming process is depicted in FIG. 1. Batch materials of glass are blended together in a blender 10 and are melted in a furnace 12 to produce molten glass. The molten glass is fed through a die or bushing (typically of platinum) 14 that has a plurality of very small orifices formed through it. The molten glass flows under gravity out from the orifices to create a plurality of streams of molten glass, and as the streams fall downward they are cooled and solidify into glass filaments 16. Typically a number of the filaments 16 are gathered together to form a strand 18. Before they are gathered together in the form of strands, the filaments are coated with a coating of a binder or sizing composition in a binder application process 20. The strand 18 of coated filaments is then advanced to a winder 22 where the strand is wound about a forming tube (not shown in FIG. 1) to form a cake 24. Typically a plurality of the cakes 24 are then transported, such as by a cart 26 or other means, to an area where the applied coating composition is dried or cured. In the case of some types of coating compositions, it is necessary to heat the cakes to cure the composition. Accordingly, the cakes are transported into a drying/curing oven 28 or the like. The oven typically heats the cakes to a temperature of about 200° F. to 400° F., the temperature depending in part on the particular coating composition(s) applied. After drying/curing, the cakes are removed from the oven and the resulting glass fibers are subjected to further processing operations 30, which can include warping, texturizing, yarn forming, or the like.

A glass fiber cake 24 in accordance with one embodiment of the invention is shown in FIGS. 1-4. The basic concept of the invention is to allow vapors generated during the drying/curing process to escape the cake in all directions, including through the forming tube on which the glass fiber is wound, as depicted in FIG. 3. Accordingly, the glass fiber is wound about a forming tube 32 that is pervious to the vapors that are generated. Various constructions and materials can be used in making a pervious forming tube in accordance with the invention.

One embodiment of a forming tube 32 is shown in greater detail in FIG. 4. The forming tube comprises a plurality (two, in the illustrated embodiment) of plies 34, 36 of fibrous material spirally wound about an axis of the tube and adhered together to form a tubular body wall. The fibrous material can be formed of various types of fibers, and the plies can be formed by various processes. For instance, the plies can comprise synthetic fibers formed into sheets by a papermaking type of process (to make so-called synthetic paper); alternatively, the plies can comprise synthetic fibers formed into sheets by various types of non-woven fabric production processes. As still another alternative, the plies can comprise paper or paperboard (collectively referred to herein as "paper"). The paper can be a highly open or porous paper, or can be mechanically perforated with relatively larger holes. In the case of unperforated paper plies 34, 36, at least the outermost ply 36 can include a sizing composition to render the paper substantially impervious to liquids used in the coating composition, yet pervious to the vapors generated during the drying/curing process. Wound paperboard forming tubes typically comprise about three to five plies, which include one or two primary structural layers of paperboard that are relatively thicker, and an inner ply and an outer ply that are relatively thinner and may comprise extensible kraft. All of the plies making up the tube can include the sizing composition, if desired.

The sizing composition essentially fills the larger pores in the paperboard so that liquid is substantially prevented from penetrating but vapor can pass through smaller pathways in the paperboard structure.

An alternative embodiment of a forming tube 40 in accordance with the invention is shown in FIG. 5. The forming tube 40 is formed of plastic and has a plurality of openings 42 that extend through the wall of the tube. The openings 42 advantageously are relatively small, for example less than about 0.1 inch in diameter (or maximum distance across the opening, in the case of non-circular openings). The outer surface 44 of the tube is cylindrical, except for the presence of the openings. The openings can be formed in various ways, such as during the process of molding the tube 40, or by a mechanical process after the molding of the tube. Although a plastic tube with openings is shown, other materials besides plastic can be used, such as metal or paperboard.

Forming tubes in accordance with some embodiments of the invention can be designed for a single use, after which they may be discarded. Such single-use forming tubes advantageously are formed from relative inexpensive materials such as paperboard (either perforated similar to FIG. 5, or non-perforated as in FIG. 4), nonwoven sheet material (not shown), and the like.

In use, a forming tube in accordance with the invention is loaded on a winder, and glass fiber, after being coated with one or more coating compositions, is wound about the tube to form a glass cake. The cake is removed from the winder and transferred to a further station for drying or curing. In some cases, it may be sufficient to allow the cake to dry without application of heat; in other cases, heat may be necessary to cure the coating composition and/or to speed the drying of the coating. In either situation, the forming tube in accordance with the invention allows vapor transport through the tube and thereby facilitates the drying and/or curing. Heat transfer through the wall is also enhanced relative to prior-art impervious forming tubes. As a result of the improved vapor and heat transport afforded by the forming tube, it is expected that the properties of the coated glass fiber should be more-uniform throughout the cake.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A glass forming tube about which newly formed and coated glass fiber is wound to form a cake of glass fiber, the forming tube comprising:

a plurality of paperboard plies spirally wound one upon another about an axis of the forming tube and adhered together to form a tubular body wall, the paperboard plies being free of silicone coating, wherein at least an outermost one of the plies comprises paperboard treated with a sizing compound so as to render the paperboard substantially impervious to liquid coating composition applied to the glass fiber but pervious to vapors generated during curing and drying of a cake of glass fiber.

* * * * *